J. J. GÖTZ.
APPARATUS FOR MEASURING AREAS BY MEANS OF ELECTRIC RESISTANCE COILS.
APPLICATION FILED APR. 15, 1907.
981,552.
Patented Jan. 10, 1911.
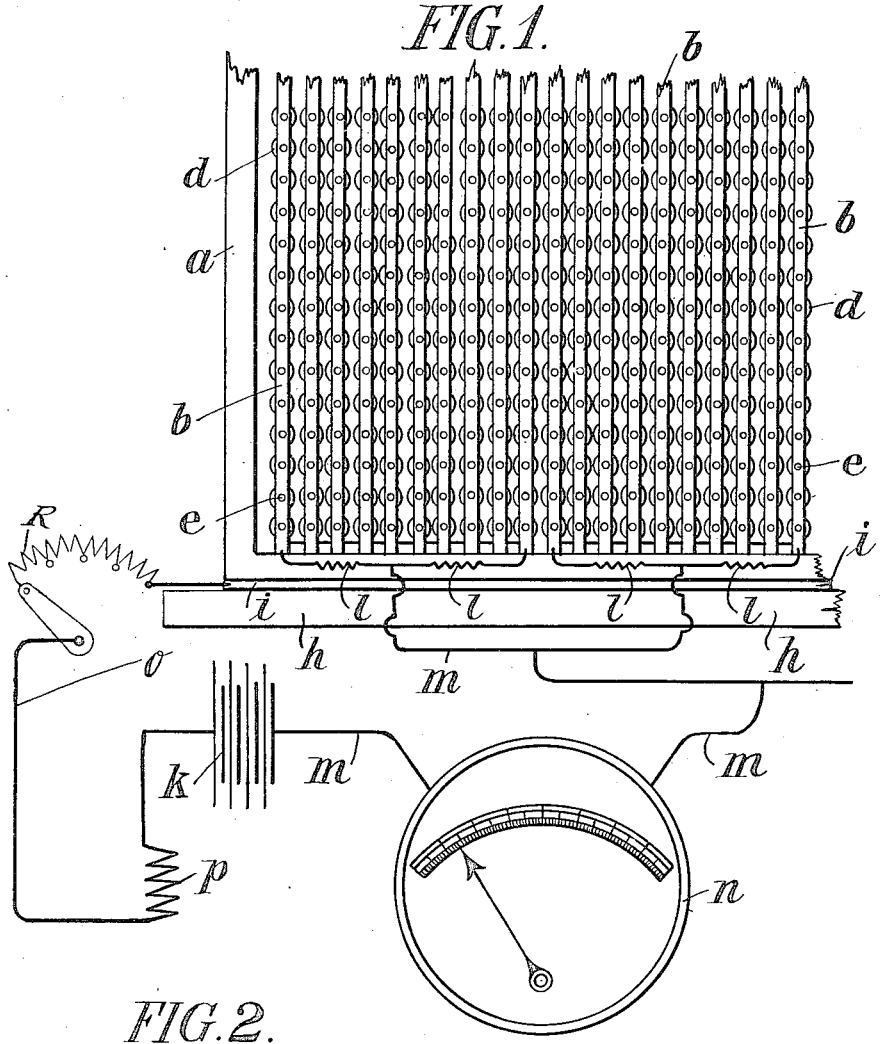
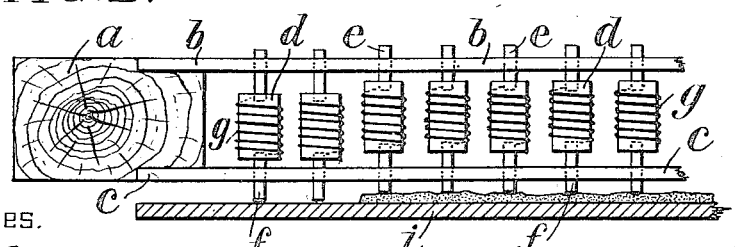

UNITED STATES PATENT OFFICE.

JULIUS JOSEF GÖTZ, OF OFFENBACH-ON-THE-MAIN, GERMANY.

APPARATUS FOR MEASURING AREAS BY MEANS OF ELECTRIC-RESISTANCE COILS.

981,552.                Specification of Letters Patent.   Patented Jan. 10, 1911.

Application filed April 15, 1907. Serial No. 368,209.

To all whom it may concern:

Be it known that I, JULIUS JOSEF GÖTZ, a subject of the German Emperor, residing in Offenbach-on-the-Main, in the Empire of Germany, works director, have invented certain new and useful Improvements in Apparatus for Measuring Areas by Means of Electric-Resistance Coils, for which application has been made in Germany, dated April 17, 1906.

This invention relates to apparatus for measuring irregular areas, for instance of leather, hides and the like, by means of coils of a known ohmic resistance.

The great advantage of this invention consists more particularly in that in this manner an exact measurement is obtained and also the measuring may be exactly controlled, and finally the measuring requires only a very weak current and the working of the measuring apparatus may be permanently and uniformly maintained. The measuring apparatus hitherto constructed for this object in contrast to the present invention, employ exclusively the product of a large number of electrical contacts, which however neither allow of a gaging nor produce an exact result, as this is always dependent on the size and actual condition of the contact surfaces. By my improved method, coils of a known resistance are operated by means of displaceable contacts by the material to be measured itself, in such a way that the superficial area is obtained exclusively by means of the amount of current flowing through the resistance coils, which are thereby switched on.

In order to carry out this improved method the apparatus shown in the accompanying drawings is employed, in which:—

Figure 1 is a plan view of the apparatus; and Fig. 2 a sectional view showing the coils.

A frame $a$ of non-conducting material, of which the drawings only show a portion, is provided with a given number of parallel bars $b$ $c$ of which the bars $b$ serve for guiding the pins to which the resistances are secured and also for conducting the current, while the bars $c$ of non-conducting material serve only for guiding. In these bars peculiarly constructed bodies $d$ are mounted. These consist for instance of a non-conducting part, in which, above and below, conducting pins $e$ and $f$ respectively above referred to are inserted. These two pins are connected with one another by a wire spiral $g$ of exactly determined ohmic resistance. Thus in this arrangement all the pins $e$ and therefore also all the resistances $g$ and through these again all the pins $f$ are connected in parallel. The frame $a$ with this entire arrangement is mounted on a table $h$. A metal plate $i$ lies on the table $h$. This metal plate is connected to a battery $k$ by means of a wire $o$. The metal bars $b$ of the frame $a$ are connected with a measuring device $n$ and the other pole of the battery $k$, by the intermediary of again exactly known resistances $l$, through the wire $m$. At R, in the circuit between the resistance $p$, and the plate $i$, is provided a rheostat R for varying the resistances $p$ and $l$, in accordance with the number of coils in circuit, so as to keep a constant potential difference between the plates $b$ and $i$ at the opposite ends of the coils. To insure this, the external resistance may be changed by means of the rheostat R to suit each case. Now if a flat object of irregular shape be laid on this metal plate $i$, which object of course must be of non-conducting material in the present case, such for instance as leather, at all the places which are not covered by the leather or the like, the pins $f$ encounter the metal plate $i$ and convey a current, but everywhere where the leather lies, the pins $f$ and therewith the bodies $d$ and the resistances $g$ are lifted (see Fig. 2), and thus disconnected. As all the resistances are connected in parallel over the entire apparatus the more pins $f$ in contact with the plate $i$, the stronger the current conveyed.

The action and accuracy of the arrangement hereinbefore described will now be explained in connection with the following example. Assuming that the table $h$ and the plate $i$ are 3 meters in length, 1.5 meters in width and contain thus 4.5 square meters of area, and the free space of the frame $a$ has the same dimensions. In this the bars $b$ $c$ are at 20 millimeters apart and each bar has 30 resistances $d$ $g$, so that in all 4500 resistances $d$ $g$ and the respective contacts $e$ $f$ belonging thereto are provided. Each contact thus means a superficial area of 0.001 square meter. As the source of current there is employed for instance an accumulator $k$, the potential of which is maintained by means of a resistance constant at 1.8 volts. This resistance admits the passage of exactly 4.5 amperes without becoming heated. The resistance is thus:

$$\frac{1.8}{4.5} = 0.4 \text{ ohms.}$$

At 1.8 volts there must thus be 0.4 ohms in order that the strength of the current may not rise above 4.5 amperes. The 150 bars $b$ are divided into 15 groups for each 300 coils, in order not to require too high a resistance. Each group therefore requires $0.4 \times 15 = 6$ ohms. Each group thus absorbs $$\frac{1.8}{6} = 0.3 \text{ amperes.}$$

To each spiral $d\ g$ there comes therefore $$\frac{0.3}{300} = 0.001 \text{ amperes.}$$

Each coil has an exactly ascertained resistance of 30 ohms. Each group of 300 coils therefore represents when all the coils $d\ g$ are in contact with the plate $i$ as they are all connected in parallel $$\frac{30}{300} = 0.1 \text{ ohms.}$$

As the resistance of 300 coils of each group is thus 0.1 ohms, 5.9 ohms must be switched on, in order to obtain together 6 ohms, in order that each group may not absorb more than 0.3 amperes. This current is distributed over the 300 coils connected in parallel and as, as already hereinbefore stated, each coil allows 0.001 amperes to pass, each coil however also corresponds to an area of 0.001 square meters, each 0.001 amperes also indicates 0.001 square meters of area.

By "resistance," I do not mean a rheostat or any fixed resistance, but the internal resistance is intended, which the wire, from which each separate coil is made, possesses.

The accumulator battery $k$, yields any suitable quantity of current at any suitable potential. The entire measuring apparatus is so constructed that it consumes as a maximum, 4.5 amperes, that is to say, when all the coils are simultaneously connected, then 4.5 amperes pass simultaneously through all the coils. Now, in order to prevent more amperes being given off, by the battery $k$, the resistance $p$, is provided, which never allows more than 4.5 amperes at 1.8 volts to flow into the measuring apparatus. This quantity of current flows directly into the metal plate $i$, and from this, when all the coils are mounted thereon, through the entire apparatus, that is to say, through all the coils. There are 4,500 coils, therefore a quantity of current of .001 ampere comes to each coil. Each coil is so made that it yields a resistance of 30 ohms. Now 300 coils are always combined into a separate group, and the conductor $m$ is so arranged that the whole 4.5 amperes, passing through all the coils is distributed by the resistances $l$, over the entire 15 groups. All the resistances $l$, together, thus allow 4.5 amperes at 1.8 volts potential to pass through, exactly as many as are admitted to the apparatus by the resistance $p$. Each separate resistance $l$, is however, so formed that it only allows a .3 ampere current to pass, as an exactly equal quantity of current must come to each group as a maximum.

If the measuring instrument $n$ be arranged in such a way that it does not indicate current strengths but the areas corresponding thereto, the superficial area of the body to be measured may be immediately and exactly read off from the instrument up to 0.001 square meter.

The constructional arrangement of the apparatus hereinbefore described may of course be any suitable one, and may be carried out in the most varied way.

I declare that what I claim is:—

1. In a measuring device for measuring the area of irregular surfaces, a plate of conducting material adapted to receive the article, a frame in proximity to said plate, movable contact devices arranged in said frame, said contact devices being adapted to engage the plate of conducting material, ohmic resistances on said devices, a source of electric energy, a measuring device interposed between said source of energy and the resistances, said resistances having one end connected to one pole of the source, and the other end connected to the contact devices.

2. In a device for measuring the area of irregular surfaces a plate formed of electric conducting material, a source of electric energy connected to said plate, a plurality of independent means arranged in parallel for closing the electric circuit at a plurality of symmetrically spaced points on said plate, ohmic resistances of known value connected to each of said closing means, means for enabling each of said closing means to be held out of contact with said plate by the article to be measured, means for measuring the current passing through the circuit, the circuit being such that the one pole of the source of energy connects with the plate, the other pole connects with one end of each resistance, and the other end of each resistance connects with one of the circuit closing means.

3. In a device for measuring the area of irregular surfaces, a frame, two series of symmetrically spaced bars arranged on said frame, a conducting plate, movable contact devices arranged between said series of bars, bodies arranged on said contact devices, said devices being adapted to make contact with said plate, resistances carried by said bodies, an ammeter for indicating the number of contact devices raised by the article to be measured, and which is interposed between said plate and said contact devices, a battery for furnishing current, and circuits from said battery to said bars, devices, resistances and ammeter.

In witness whereof, I have hereunto signed my name this 22 day of March 1907, in the presence of two subscribing witnesses.

JULIUS JOSEF GÖTZ.

Witnesses:
JEAN GRUND,
CARL GRUND.